US007851577B2

(12) United States Patent
Bochmann et al.

(10) Patent No.: US 7,851,577 B2
(45) Date of Patent: *Dec. 14, 2010

(54) POLYMERIZATION PROCESS USING ZINC HALIDE INITIATORS

(75) Inventors: Manfred Bochmann, Norwich (GB); Antonio Guerrero, Norwich (GB); Kevin Kulbaba, Sarnia (GB)

(73) Assignee: LANXESS Inc., Sarnia, Ontario (CA)

( * ) Notice: Subject to any disclaimer, the term of this patent is extended or adjusted under 35 U.S.C. 154(b) by 756 days.

This patent is subject to a terminal disclaimer.

(21) Appl. No.: 11/709,487

(22) Filed: Feb. 22, 2007

(65) Prior Publication Data

US 2007/0238843 A1 Oct. 11, 2007

Related U.S. Application Data

(60) Provisional application No. 60/782,157, filed on Mar. 14, 2006.

(51) Int. Cl.
*C08F 10/10* (2006.01)
*C01G 9/04* (2006.01)

(52) U.S. Cl. .................. 526/348.7; 423/462; 423/472; 502/157; 502/226; 502/343; 526/170; 526/183; 526/237; 526/335; 526/339; 526/340.2; 528/9

(58) Field of Classification Search ............... 423/462; 423/472; 502/157, 226, 343; 526/170, 183, 526/237, 335, 339, 340.2, 348.7; 528/9
See application file for complete search history.

(56) References Cited

U.S. PATENT DOCUMENTS

| 2,356,128 | A | 8/1944 | Thomas et al. ............... 260/79 |
| 3,965,078 | A | 6/1976 | Priola et al. ................. 526/154 |
| 5,703,182 | A | 12/1997 | Langstein et al. ............ 526/185 |
| 7,041,760 | B2 * | 5/2006 | Bochmann et al. ........... 526/190 |
| 2002/0132904 | A1 | 9/2002 | Langstein et al. ............ 524/495 |
| 2005/0070680 | A1 * | 3/2005 | Bochmann et al. ........ 526/348.7 |

FOREIGN PATENT DOCUMENTS

| CA | 2441079 | 3/2005 |
| DE | 198 36 663 | 2/2000 |
| EP | 0 920 909 | 6/1999 |
| EP | 1 111 004 | 6/2001 |
| EP | 1 236 767 | 9/2002 |
| EP | 1 516 883 | 3/2005 |
| WO | 95/29940 | 11/1995 |
| WO | 99/09036 | 2/1999 |
| WO | 00/04061 | 1/2000 |

OTHER PUBLICATIONS

Garratt et al., "Arylzinc Complexes as New Initiator Systems for the Production of Isobutene Copolymers with High Isoprene Content", Mar. 15, 2004, Angew. Chem. Int.l Ed., 43(16), 2166-2169.*
Guerrero et al., "Synthesis and Crystal Structure of Ethyl Zinc Chloride", Feb. 7, 2006, Organometallics, 25(6), 1525-1527.*
Guerroro, A., Kulbaba, K., and Bochmann, M., "Alkyl Zinc Chlorides as New Initiators for the Polymerization and Copolymerization of Isobutene". Macromol. Chem. Phys. 2008, 209, 1714-1720.*
Guerroro, A., Kulbaba, K., and Bochmann, M., "'Highly Reactive' Poly(isobutene)s via Room Temperature Polymerization with a New Zinc-Based Initiator System". Macromolecules 2007, 40, 4124-4126.*
Ullmanns Encyclopedia of Industrial Chemistry, vol. A 23 1993, pp. 288-295, Elvers et al "Rubber, 3. Synthetic".
Song, X.; Thornton-Pett, M.; Bochmann, M.; Organometallics 1998, 17, pp. 1004-1006 "Synthesis, Structure, and Reactivity of $(C_5H_4SiMe_3)_2Y\{\mu\text{-}FC_6F_4)(\mu\text{-Me})B(C_6F_5)_2\}$: Tight Ion Pairing in a Cationic Lanthanide Complex"}.
Carr, A.G.; Dawson, D.M.; Bochmann, M.; M. Macromol. Rapid Commun. 1998, 19, 205-207 "The $[Zr(N\{SiMe_3\}_2)_3]^+$ cation as a novel initiator for carbocationic isobutene homo- and isobutene/isoprene co-polymerisations".
Chem. Eur. J. 2004, 10, pp. 6323-6332; Mario Vierle et al; "Solvent-Ligated Manganese(II) Complexes for the Homopolymerization of Isobutene and the Copolymerization of Isobutene and Isoprene".
Morton, Maurice; "Rubber Technology" Third Edition, Chapter 10 (Van Nostrand Reinhold Company@ 1987) pp. 297-300.
Encyclopedia of Polymer Science and Engineering, vol. 4, S. 66 et seq. (Compounding) John Wiley & Sons.
Encyclopedia of Polymer Science and Engineering, vol. 17, S. 666 et seq (Vulcanization) John Wiley & Sons.

* cited by examiner

*Primary Examiner*—James Seidleck
*Assistant Examiner*—Richard A Huhn
(74) *Attorney, Agent, or Firm*—Michael A. Miller

(57) ABSTRACT

A cationic polymerization process for isoolefins using a zinc halide initiator. The zinc halide initiator is added to a solution of the isoolefin in a suitable solvent, preferably a halocarbon solvent. Polymerization reactions are normally conducted at temperatures high enough to allow the zinc halide initiator to dissolve in the solution. An alkyl halide activator may optionally be used and is preferably added to the solution prior to the zinc halide initiator. A multiolefin may optionally be present in the solution. The process is particularly useful in the formation of isoolefin homopolymers and co-polymers of isoolefins and multiolefins, such as butyl rubber.

14 Claims, No Drawings

POLYMERIZATION PROCESS USING ZINC HALIDE INITIATORS

This Application claims the benefit of U.S. Provisional Application Ser. No. 60/782,157 filed on Mar. 14, 2006.

FIELD OF THE INVENTION

The invention relates to the cationic polymerization of isoolefins and optionally multiolefins using zinc halide initiators. More particularly, the invention relates to the cationic polymerization of isobutene and isoprene to form butyl rubber polymers using zinc halide initiators and optionally alkyl halide co-initiators.

BACKGROUND

Poly(isobutylene-co-isoprene), or IIR, is a synthetic elastomer commonly known as butyl rubber which has been prepared since the 1940's through the random cationic copolymerization of isobutylene with small amounts of isoprene (1-2 mole %). As a result of its molecular structure, IIR possesses superior air impermeability, a high loss modulus, oxidative stability and extended fatigue resistance.

Butyl rubber is a copolymer of an isoolefin and one or more, preferably conjugated, multiolefins as comonomers. Commercial butyl comprises a major portion of isoolefin and a minor amount, not more than 2.5 mol %, of a conjugated multiolefin.

Butyl rubber or butyl polymer is generally prepared in a slurry process using a suitable polymerization solvent, such as methyl chloride, and a Friedel-Crafts catalyst, such as $AlCl_3$, as the polymerization initiator. The methyl chloride offers the advantage that $AlCl_3$, a relatively inexpensive Friedel-Crafts catalyst, is soluble in it, as are the isobutylene and isoprene comonomers. Additionally, the butyl rubber polymer is insoluble in the methyl chloride and precipitates out of solution as fine particles. The polymerization is generally carried out at temperatures of about −90° C. to −100° C. See U.S. Pat. No. 2,356,128 and Ullmanns Encyclopedia of Industrial Chemistry, volume A 23, 1993, pages 288-295. The low polymerization temperatures are used to achieve molecular weights which are sufficiently high for rubber applications.

Other compounds that have been found to be active as catalysts for polymerizing isoolefins include organometallic compounds in combination with a cation-generating agent, for example $C_5Me_5TiMe_3/B(C_6F_5)_3$ (WO-00/04061-A1), $Cp_2AlMe/B(C_6F_5)_3$ (U.S. Pat. No. 5,703,182), and combinations of zirconocenes and related complexes with either $B(C_6F_5)_3$ or $CPh_3[B(C_6F_5)_4]$ (WO-95/29940-A1, DE-A1-198 36 663), Song, X.; Thornton-Pett, M.; Bochmann, M. *Organometallics* 1998, 17, 1004, Carr, A. G.; Dawson, D. M.; Bochmann, M. *Macromol. Rapid Commun.* 1998, 19, 205.

Nuyken, in collaboration with M. Bohnenpoll (Chem. Eur. J. 2004, 10, 6323), published a system based on $[Mn(NCMe)_6]^{2+}$ salts of non-coordinating borate anions which was active at room temperature:

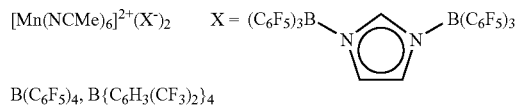

$[Mn(NCMe)_6]^{2+}(X^-)_2 \quad X = (C_6F_5)_3B\text{-N}\overset{\frown}{\underset{\smile}{\;}}\text{N-}B(C_6F_5)_3$ $B(C_6F_5)_4, B\{C_6H_3(CF_3)_2\}_4$ This system operated at +30° C. in $IB/CH_2Cl_2$ but showed no activity ≦0° C. Polymerizations were generally slow (55-110 h for IB homopolymerizations), and there was some doubt about the mechanism. IB homopolymers and copolymers had Mn=8,000-10,000. Conversion was rapidly depressed at higher IP feed.

Zinc compounds have not commonly been used as catalysts for isoalkene polymerizations. Indeed, $ZnCl_2$ in the presence or absence of alkyl halide activators (such as $Me_3CCl$ or MeCOCl) and used either in neat isobutene or in isobutene/methyl chloride mixtures, proves to be inactive, and no polymer is obtained. Recently however, Bochmann and coworkers filed a patent on the use of $Zn(C_6F_5)_2/Bu^tCl$ system for IB homo- and IB/IP copolymerizations (Canadian patent application 2,441,079, filed Sep. 16, 2003). Zinc had never been used as an initiator for cationic polymerizations before. This patent teaches that this system possessed particularly good copolymerization characteristics and allowed the formation of IB/IP copolymers in neat IB solutions (no solvent). The polymers had up to 15 mol-% IP, with little gel content. However, monitoring the reaction of $Zn(C_6F_5)_2$ with tert-butyl chloride ($^tBuCl$) always found substantial amounts of $C_6F_5H$ together with insoluble precipitates. In addition, the $Zn(C_6F_5)_2$ is expensive to use in a commercial scale process and lower cost alternatives are therefore being sought.

The need therefore remains for improved polymerization processes using zinc-based initiators.

SUMMARY OF THE INVENTION

According to the present invention, there is provided a process for the cationic polymerization of an isoolefin monomer using a zinc-based initiator, the process comprising: providing a solution of the isoolefin monomer in a halocarbon solvent; adding a zinc-based initiator comprising an alkyl or aryl zinc halide to the solution; and, reacting the solution containing the zinc-based initiator to form a polymer comprising the isoolefin.

Polymerization reactions may be conducted at temperatures high enough to allow the zinc halide initiator to dissolve in the solution. An alkyl halide activator may optionally be used and is preferably added to the solution prior to the zinc halide initiator. Multiolefins may optionally be present with the isoolefin in the solvent and may participate in the reaction to form co-polymers with the isoolefin. The isoolefin may comprise isobutene, the multiolefin may comprise isoprene and the polymer may comprise butyl rubber.

The zinc halide initiators used in the process of the present invention advantageously exhibit high solubility in the solvent and are low in cost.

Further features of the invention and preferred embodiments thereof will now be more thoroughly described.

DETAILED DESCRIPTION

The present invention relates to isoolefin homopolymers and co-polymers of isoolefins, multiolefins and optionally other co-polymerizable monomers. In a preferred embodiment, the co-polymer is a butyl rubber polymer. The terms "butyl polymer", "butyl rubber" and "butyl rubber polymer" are used interchangeably throughout this specification and are intended to mean a polymer prepared by reacting a major portion of an isoolefin monomer with a minor portion of a multiolefin monomer.

The process is not limited to a specific isoolefin. However, isoolefins within the range of from 4 to 16 carbon atoms, in particular 4-8 carbon atoms, such as isobutene, 2-methyl-1- butene, 3-methyl-1-butene, 2-methyl-2-butene, 4-methyl-1-pentene and mixtures thereof are preferred. Most preferred is isobutene.

When multiolefins are present in the reaction mixture, the process is not limited to a specific multiolefin. Every multiolefin copolymerizable with the isoolefins known by the skilled in the art can be used. Multiolefins with in the range of from 4-14 carbon atoms are preferred. A preferred $C_4$ to $C_{14}$ multiolefin comprises a $C_4$ to $C_{10}$ conjugated diolefin. Some specific non-limiting examples of suitable multiolefins include isoprene, butadiene, 2-methylbutadiene, 2,4-dimethylbutadiene, piperyline, 3-methyl-1,3-pentadiene, 2,4-hexadiene, 2-neopentylbutadiene, 2-methly-1,5-hexadiene, 2,5-dimethly-2,4-hexadiene, 2-methyl-1,4-pentadiene, 2-methyl-1,6-heptadiene, cyclopenta-diene, methylcyclopentadiene, cyclohexadiene, 1-vinyl-cyclohexadiene and mixtures thereof. Isoprene is particularly preferably used.

The polymer may be derived from a mixture comprising only the isoolefin monomer. The polymer may also be derived from a mixture from about 70 to 99.5 parts by weight of the $C_4$ to $C_8$ isoolefin monomer and from about 30 to about 0.5 parts by weight of the $C_4$ to $C_{14}$ multiolefin monomer. More preferably, the polymer is derived from a mixture comprising from about 80 to about 99.5 parts by weight of the $C_4$ to $C_8$ isoolefin monomer and from about 20 to about 0.5 parts by weight of the $C_4$ to $C_{14}$ multiolefin monomer. A most preferred polymer according to the present invention is derived from a mixture comprising from about 97 to about 99.5 parts by weight of isobutylene and from about 3 to about 0.5 parts by weight of isoprene.

Those of skill in the art will recognize that it is possible to include an optional third monomer to produce a butyl terpolymer. For example, it is possible to include a styrenic monomer in the monomer mixture, preferably in an amount up to about 15 percent by weight of the monomer mixture. The preferred styrenic monomer may be selected from the group comprising p-methylstyrene, styrene, α-methylstyrene, p-chlorostyrene, p-methoxystyrene, cyclopentadiene, methylcyclopentadieneindene, indene derivatives and mixtures thereof. The most preferred styrenic monomer may be selected from the group comprising styrene, p-methylstyrene and mixtures thereof. Other suitable copolymerizable termonomers will be apparent to those of skill in the art.

Suitable polymerization processes for producing isoolefin-containing polymers, particularly butyl rubber polymers, are known to persons skilled in the art and are further described in U.S. Pat. No. 2,356,128. Generally, the processes involve providing the monomer mixture dissolved in a suitable solvent. The solvents are generally organic fluids. Organic fluids suitable for use in commercial butyl rubber polymerization include inert $C_1$ to $C_4$ halogenated hydrocarbons and mixtures thereof, $C_5$ to $C_8$ aliphatic hydrocarbons, $C_5$ to $C_8$ cyclic hydrocarbons, mixtures of one or more of the halogenated hydrocarbons and one or more of the aliphatic hydrocarbons, and mixtures of one or more of the halogenated hydrocarbons and one or more of the cyclic hydrocarbons. Examples of preferred inert organic fluids or solvents include pentane, hexane, heptane and mixtures thereof with one another or with halogenated hydrocarbons such as methyl chloride and/or dichloromethane. Most preferably the organic fluid is a halogenated hydrocarbon selected from the group consisting of methyl chloride, dichloromethane and mixtures thereof.

A zinc based initiator according to the present invention comprises a divalent zinc halide Lewis acid that is preferably soluble in either neat IB or in mixtures of IB and a suitable organic solvent. Although zinc chloride ($ZnCl_2$) is a simple zinc halide that would be suitable for use as an initiator, it is not soluble in either neat IB or IB/solvent mixtures. The preferred zinc halides therefore comprise soluble organic zinc halides, more preferably alkyl or aryl zinc halides, yet more preferably short-chain alkyl zinc halides. Since the zinc is divalent, there is only one alkyl or aryl group present in addition to the halide group. The zinc halide preferably does not comprise an alkoxide. The preferred halogen is chlorine, although bromine may also be used. Examples of preferred zinc halides include compounds of the formula:

$$R\text{—}Zn\text{—}X \qquad (1)$$

wherein,

R is methyl, ethyl, propyl or butyl; and,

X is Cl, Br, or I.

It might be advantageous to further add an activator or co-initiator to the monomer mixture. The invention is not limited to any special co-initiator/activator as long as the co-initiator compound does not adversely affect the polymerisation reaction. Preferred are activators of the general formula HX, RX, $R_3CX$ or RCOX with each R independently being a $C_1$ to $C_{50}$ hydrocarbon radical which may be linear, branched or cyclic and may contain one or more non-carbon atoms in the carbon-chain, such as methyl, ethyl, n-propyl, n-butyl, s-butyl, t-butyl, pentyl, hexyl, octyl, nonyl, decyl, dodecyl, cumyl, 3-methylpentyl, 2,4,4-trimethylpentyl and 3,5,5-trimethylhexyl and each X being a halogen, preferably chlorine, bromine or iodine. Preferred co-initiators are $Me_3CCl$, $^tBuCl$, cumyl chloride, TMP-2-chloride, MeCOCl, and $Me_3CBr$. Most preferred are $^tBuCl$ and cumyl chloride.

The preferred ratio of zinc compound to co-initiator(s) is in the range of from 1:0.1 to 1:10 by mol, and the most preferred ratio is in the range of from 1:1 to 1:3.

Ethyl zinc chloride (EtZnCl) is a particularly preferred zinc-based initiator that exhibits good solubility in mixtures of IB with the halocarbon solvent dichloromethane ($CH_2Cl_2$), but limited solubility in neat IB. EtZnCl is a Cl-bridged tetramer. The solid is soluble in organic solvents at room temperature. The system EtZnCl/Bu$^t$Cl shows good activity for IB polymerization and IB/IP copolymerizations. Because even in this system the in-situ generated $ZnCl_2$ is insoluble in IB/$CH_2Cl_2$ mixtures at −78° C., the system shows best activities at temperatures ≧−35° C. However, the system EtZnCl/cumyl chloride has improved low temperature solubility and exhibits good polymerization activity at temperatures of −78° C. down to −90° C. or lower. The monomers are therefore preferably polymerized at temperatures in the range of from −100° C. to 40° C., more preferably in the range of from −90° C. to 35° C., yet more preferably in the range of from −80° C. to 35° C., even more preferably in the range of from −70° C. to 35° C., still more preferably in the range of from −60° C. to 35° C., yet even more preferably in the range of from −50° C. to 35° C., yet still more preferably in the range of from −35° C. to 35° C. and at pressures in the range from 0.1 to 4 bar.

The use of a continuous reactor as opposed to a batch reactor may have a positive effect on the process. Preferably, the process is conducted in at least one continuos reactor having a volume of between 0.1 m$^3$ and 100 m$^3$, more preferable between 1 m$^3$ and 10 m$^3$.

If polymerization is performed continuously, the process is preferably performed with at least the following feed streams:

I) solvent/diluent (preferably dichloromethane)+isoolefin (preferably isobutene)+multiolefin (if present, preferably a diene, such as isoprene); and, II) zinc halide compound (preferably ethyl zinc chloride)

The alkyl halide activator (if present) can be either pre-dissolved in the solvent or added to the solvent in conjunction with or following addition of the monomers. The alkyl halide activator is preferably provided prior to addition of the zinc halide initiator.

The zinc halide initiator system may be used to produce either IB homopolymers of co-polymers of IB and a diene monomer. When the diene monomer is isoprene, the co-polymer of IB and IP is butyl rubber. The IB homopolymer has a molecular weight ($M_n$) in the range of from 25,000 to 500,000 and the IB/IP co-polymer has a molecular weight in the range of from 15,000 to 500,000.

Polymers comprising residual double bonds resulting from the inventive process may be the starting material for a halogenation process in order to produce halo-butyl polymers. Bromination or chlorination can be performed according to the procedures described in Rubber Technology, $3^{rd}$ Ed., Edited by Maurice Morton, Kluwer Academic Publishers, pp. 297-300 and references cited within this reference.

The copolymers presented in this invention are ideally suitable for the production of moldings of all kinds, in particular tire components and industrial rubber articles, such as bungs, damping elements, profiles, films, coatings. The polymers are used to this end in pure form or as a mixture with other rubbers, such as NR, BR, HNBR, NBR, SBR, EPDM or fluororubbers. The preparation of these compounds is known to those skilled in the art. In most cases carbon black is added as filler and a sulfur based curing system is used. Peroxide based curing systems may also be used, particularly when the polymer contains at least 4 mol % of repeating units derived from at least one multiolefin monomer. For compounding and vulcanization, reference is made to Encyclopedia of Polymer Science and Engineering, Vol. 4, S. 66 et seq. (Compounding) and Vol. 17, S. 666 et seq. (Vulcanization). The vulcanization of the compounds is usually effected at temperatures in the range of 100 to 200° C., preferred 130 to 180° C. (optionally under pressure in the range of 10 to 200 bar).

The following Examples are provided to illustrate the present invention.

EXAMPLES

Example 1

EtZnCl System for IB Homopolymerizations

IB (9 ml) was condensed into a graduated vessel at −78° C. Pre-chilled dichloromethane was injected to complete a 22 mL total reaction volume. A $^t$BuCl stock solution in dichloromethane (100 μmol/mL $CH_2Cl_2$) was prepared at −78° C. An aliquot with the appropriate amount of $^t$BuCl was added to the reactor, followed by the addition of solid EtZnCl. At this temperature the white solid did not change. However, when the mixture was allowed to warm to −35° C. (checked with internal thermocouple) the solid dissolved completely. EtZnCl was used in an excess, and $^t$BuCl was used to control the polymerization rate as the limiting reagent. Reactions were quenched in methanol, dried at 60° C. until constant weight. Results are reported in Tables 1-4.

The system was sealed and was warmed to the set temperature indicated in the tables. For reactions at 20° C. the internal pressure has been calculated to be 2 bar. The solution became very cloudy after one minute (the time required for the mixture to reach the critical temperature of −35° C. where reaction starts). Cooling again to −78° C. gave only traces of polymer (run 637). This shows that the zinc species involved in the polymerization are insoluble at −78° C. However, if the system is sealed in order to avoid IB evaporation, very high conversions are reached at room temperature (run 639). Polymers thus prepared showed $M_n$ values of 25–47×$10^3$. High concentrations of $^t$BuCl (Run 654-655) were used to give nearly quantitative conversions after a 30 minute reaction. A decrease of temperature increases the molecular weights of the polymers. A molecular weight of up tp $\overline{M}_n$=52×$10^3$ g·mol$^{-1}$ was reached.

TABLE 1

Test reactions: Optimizing introduction of the initiator.

| Run | IB [ml] | Solvent [ml] | EtZnCl [μmol] | $^t$BuCl [μmol] | Time [min] | Yield [g] | T [° C.] | $\overline{M}_n$ × $10^{-3}$ [g/mol] | $\overline{M}_w$ × $10^{-3}$ [g/mol] | PDI | OBSERVATIONS |
|---|---|---|---|---|---|---|---|---|---|---|---|
| 620 | 10 | 20 ($CH_2Cl_2$) | 600 | 600 | 30 | Traces | −78 | — | — | — | Initiator premixed in $CH_2Cl_2$ at R.T. Formation of a white solid. |
| 621 | 10 | 20 (toluene) | 1000 | 1000 | 5 | 0.15 | −78 | — | — | — | Initiator premixed in toluene at R.T. Formation of a white solid and pale yellow solution. |
| 622 | 10 | 20 (toluene) | 300 (Not soluble) | 300 | 20 | Traces | −78 to −6.9 | — | — | — | Initiator premixed in toluene at −78° C. |
| 627 | 15 | IB | 300 | 150 | 30 | Traces | −78 | — | — | — | IB condensed over EtZnCl at −78° C. followed by addition of $^t$BuCl |
| 635 | 10 | 20 ($CH_2Cl_2$) | 600 | 1200 | 10 | 0.03 | −78 | 11 | 18 | 1.75 | $^t$BuCl/$CH_2Cl_2$ added at −78° C. to EtZnCl and addition to reactor |
| 636 | 10 | 20 ($CH_2Cl_2$) | 600 | 600 | 10 | 0.74 | −78 to −6.9 | 30 | 49 | 1.62 | EtZnCl added the latest as a solid to the reactor |

TABLE 2

IB homopolymerizations. Conditions with EtZnCl used as a solid.

| Run | IB [ml] | $CH_2Cl_2$ [ml] | EtZnCl [μmol] | $^t$BuCl [μmol] | T [° C.] | Time [min] | Yield [g] | $\overline{M}_n \times 10^{-3}$ [g/mol] | $\overline{M}_w \times 10^{-3}$ [g/mol] | PDI | OBSERVATIONS |
|---|---|---|---|---|---|---|---|---|---|---|---|
| 637 | 10 | 20 | 600 | 300 | −35 → −78 | 5 | 0.08 | 47 | 78 | 1.67 | Once polymerisation is initiated at −35° C. the temperature is lowered to −78° C. and polymerisation is observed to stop (solubility issue). |
| 638 | 10 | 20 | 600 | — | −78 → R.T. | 30 | 0.00 | — | — | — | This reaction tests whether the real initiator is one intermediate in the reaction that takes place in the transformation to $ZnCl_2$ and $ZnEt_2$ or reaction with $^t$BuCl. |
| 639 | 10 | 20 | 100 | 100 | −78 → +40 | 14 | 4.92 | 26 | 72 | 2.80 | After 14 minutes $CH_2Cl_2$ reaches the boiling point and the pressure increased |
| 640 | 10 | 20 | 50 | 20 | −78 → R.T. | 30 | 0.17 | 47 | 86 | 1.81 | Reaction takes place with no heat evolution. |

TABLE 3

Effect of EtZnCl/$^t$BuCl concentration on homopolymerization of IB.

| Run | EtZnCl × 10³ [mol/L] | $^t$BuCl × 10³ [mol/L] | Yield [g] | Conversion [%] | $\overline{M}_n \times 10^{-3}$ [g/mol] | $\overline{M}_w \times 10^{-3}$ [g/mol] | PD |
|---|---|---|---|---|---|---|---|
| 643 | 6.4 | 1.6 | 0.42 | 6.8 | 27 | 52 | 1.91 |
| 645 | 6.4 | 2.5 | 0.82 | 13.2 | 25 | 47 | 1.87 |
| 646 | 6.4 | 2.9 | 0.97 | 15.6 | 29 | 48 | 1.65 |
| 647 | 6.4 | 4.8 | 1.36 | 30.6 | 17 | 34 | 2.00 |
| 654 | 19.3 | 14.5 | 5.9 | 95.0 | 15 | 30 | 2.06 |
| 655 | 38.7 | 29.0 | 5.9 | 95.0 | 10 | 25 | 2.49 |

Conditions: Solvent = $CH_2Cl_2$, $V_{total}$ = 31 mL, $[IB]_0$ = 5.03 M, reaction time = 30 min, T = 20° C.

TABLE 4

Temperature dependence of IB homopolymerisation with EtZnCl.

| Run | T [° C.] | Yield [g] | Conversion [%] | $\overline{M}_n \times 10^{-3}$ [g/mol] | $\overline{M}_w \times 10^{-3}$ [g/mol] | PDI | OBS |
|---|---|---|---|---|---|---|---|
| 648 | 35 | 0.21 | 3.5 | 22 | 38 | 1.70 | Over-pressure: loss of IB |
| 656 | 20 | 1.35 | 23 | 28 | 45 | 1.60 | |
| 649 | 0 | 0.44 | 7.4 | 32 | 53 | 1.68 | |
| 650 | −15 | 0.50 | 8.4 | 38 | 64 | 1.68 | |
| 651 | −35 | 0.58 | 9.8 | 52 | 84 | 1.59 | |

Conditions: Solvent = $CH_2Cl_2$, $V_{total}$ = 22 mL, $[IB]_0$ = 5.03 M, [EtZnCl] = 9.1 × 10⁻³ M, [$^t$BuCl] = 4.5 × 10⁻³ M, reaction time = 30 min.

TABLE 5

IB-IP copolymerisations with EtZnCl/$^t$BuCl

| Run | IP [ml] | Time [min] | Yield [g] | T [° C.] | IP [%] | $\overline{M}_n \times 10^{-3}$ [g/mol] | $\overline{M}_w \times 10^{-3}$ [g/mol] | PD |
|---|---|---|---|---|---|---|---|---|
| 658 | 0.2 | 30 | 1.26 | 20 | 0.62 | 23 | 40 | 1.75 |
| 659 | 0.4 | 30 | 1.34 | 20 | 2.13 | 19 | 35 | 1.84 |
| 661 | 0.7 | 30 | 0.94 | 20 | 3.40 | 14 | 32 | 2.22 |
| 660 | 0.8 | 30 | 0.98 | 20 | 3.86 | 16 | 32 | 1.99 |

Conditions: Solvent = $CH_2Cl_2$, $V_{total}$ = 22 mL, $[IB]_0$ = 5.03 M, [EtZnCl] = [$^t$BuCl] = 13.6 × 10⁻³ M.

Example 2

EtZnCl System for IB-IP Co-Polymerizations with $^t$BuCl

The ability of the EtZnCl/$^t$BuCl system to initiate co-polymerizations of IB and IP was exemplified at 20° C. Experimental procedure was similar to that used in Example 1, with the replacement of IB monomers by a mixture of IB and IP monomers. The volume of IP monomers used is provided in Table 5, with the volume of IB monomers being the balance required to make-up a total volume of 9 mL.

Up to 3.8 mol-% IP were incorporated into the co-polymers, which exhibited a molecular weight $M_n$ of approximately 16-22,000. Conversion decreases with increasing concentration of IP.

Example 3

EtZnCl System for IB-IP Co-polymerizations with Cumyl Chloride

An experimental procedure was followed that was similar to that of Example 2, with cumyl chloride replacing $^t$BuCl as the activator and polymerizations conducted at −78° C. Results are reported in Table 6.

TABLE 6

| | IB-IP copolymerisations with EtZnCl/cumyl chloride | | | | | | |
|---|---|---|---|---|---|---|---|
| Run | IP [ml] | Yield [g] | T [°C.] | IP [%] | $\overline{M}_n \times 10^{-3}$ [g/mol] | $\overline{M}_w \times 10^{-3}$ [g/mol] | PD |
| — | 0.3 | 0.71 | −78 | 0.97 | 149 | 284 | 1.9 |
| — | 0.5 | 0.65 | −78 | 1.95 | 162 | 295 | 1.8 |
| — | 0.6 | 0.60 | −78 | 2.5 | 143 | 263 | 1.8 |
| — | 0.8 | 0.42 | −78 | 3.7 | 132 | 205 | 1.5 |
| — | 1.0 | 0.10 | −78 | 5.7 | 122 | 196 | 1.6 |

Conditions: $V_{CH2Cl2}$ = 20 mL, $V_{IB}$ = 10 mL, [EtZnCl] = 1.6 × 10⁻³ M, [cumyl chloride] = 1.3 × 10⁻³ M Up to 5.7 mol-% IP were incorporated into the co-polymers, which exhibited a molecular weight $M_n$ of approximately 122,000-149,000. Conversion decreases with increasing concentration of IP. Higher incorporations of IP into the co-polymer are undoubtedly possible at different experimental conditions.

The invention claimed is:

1. A process for the cationic polymerization of an isoolefin monomer using a zinc-based initiator, the process comprising:
    a) providing a solution of the isoolefin monomer in a halocarbon solvent;
    b) adding a zinc-based initiator comprising compounds of the formula:

R—Zn—X wherein,
    R is methyl, ethyl, propyl, or butyl; and
    X is Cl, Br, or I; and,
    c) reacting the solution containing the zinc-based initiator to form a polymer comprising the isoolefin.

2. The process according to claim 1, wherein the isoolefin is isobutene.

3. The process according to claim 1, wherein the halocarbon solvent is dichloromethane.

4. The process according to claim 1, wherein the ratio of isoolefin to halocarbon solvent is in the range of from 1:1 to 1:3 by volume.

5. The process according to claim 1, wherein the process further comprises adding an alkyl halide activator to the solution prior to addition of the zinc-based initiator.

6. The process according to claim 5, wherein the alkyl halide activator is Cert-butyl chloride (ᵗBuCl) or cumyl chloride.

7. The process according to claim 5, wherein the alkyl halide activator is present in a molar amount less than or equal to the molar amount of the zinc-based initiator.

8. The process according to claim 1, wherein the zinc-based initiator is added to the solution as a solid.

9. The process according to claim 1, wherein the zinc-based initiator is added at a temperature of from −90° C. to −35° C.

10. The process according to claim 1, wherein the reaction is conducted at a temperature of from −90° C. to 35° C.

11. The process according to claim 1, wherein the polymer is an isoolefin homopolymer.

12. The process according to claim 1, wherein the solution further comprises a multiolefin monomer in an amount of from 1 to 15 mol % of total monomers in the solution.

13. The process according to claim 12, wherein the polymer is a co-polymer of the isoolefin and the multiolefin monomers.

14. The process according to claim 12, wherein the isoolefin monomer is isobutene, the multiolefin monomer is isoprene and the polymer is butyl rubber.

* * * * *